United States Patent [19]
Paulsson

[11] Patent Number: 5,325,259
[45] Date of Patent: Jun. 28, 1994

[54] OVERVOLTAGE PROTECTION FOR SERIES CAPACITOR EQUIPMENT

[75] Inventor: Lars Paulsson, Västerås, Sweden

[73] Assignee: Asea Brown Boveri AB, Vasteras, Sweden

[21] Appl. No.: 862,766

[22] PCT Filed: Nov. 26, 1990

[86] PCT No.: PCT/SE90/00776
§ 371 Date: Jun. 22, 1992
§ 102(e) Date: Jun. 22, 1992

[87] PCT Pub. No.: WO91/10275
PCT Pub. Date: Jul. 11, 1991

[30] Foreign Application Priority Data
Dec. 22, 1989 [SE] Sweden ............ 8904341-8

[51] Int. Cl.⁵ .............................. H02H 7/16
[52] U.S. Cl. ................... 361/128; 361/15; 361/16
[58] Field of Search ............ 361/15, 16, 128, 129

[56] References Cited
U.S. PATENT DOCUMENTS 4,625,254  11/1986  Fahlen ........................ 361/16
4,652,963   3/1987  Fahlen ........................ 361/16
4,860,156   8/1989  Stenström et al. ......... 361/16

Primary Examiner—A. D. Pellinen
Assistant Examiner—S. Jackson
Attorney, Agent, or Firm—Pollock, Vande Sande & Priddy

[57] ABSTRACT

An overvoltage protective device for a series capacitor (C) has a main spark gap and a first auxiliary spark gap, arranged adjacent thereto, for ignition of the main spark gap. A second auxiliary spark gap is arranged in association with the first auxiliary gap for ignition thereof. The first and second auxiliary spark gaps are connected between one of the electrodes of the the main spark gap and a voltage divider which comprises resistors (R1, R2, R3) and a varisistor (VR1). When the knee voltage of the varisistor is exceeded, the second auxiliary spark gap is ignited, the arc of which initiates ignition of the first auxiliary spark gap, the arc of which in turn moves towards and ignites the main spark gap. During the arcing time of the spark gap, a controlled discharge of the series capacitor through a resistor (R2) takes place.

20 Claims, 3 Drawing Sheets 5,325,259

OVERVOLTAGE PROTECTION FOR SERIES CAPACITOR EQUIPMENT

TECHNICAL FIELD

The present invention relates to an overvoltage protective device for series capacitor equipment, comprising a main spark gap with a first and a second main electrode for connection in parallel with a series capacitor and adapted to be ignited at a predetermined level of the voltage across the series capacitor.

BACKGROUND OF THE INVENTION

Series capacitors are used in electric power lines, primarily for increasing the transmission capacity of a power line. Such series capacitor equipment comprises a capacitor bank, which is connected into the power line and traversed by the current of the power line. The voltage across a series capacitor becomes proportional to the current in the power line, and at an overcurrent in the power line, caused, for example, by a short circuit in the power network, an overvoltage occurs across the series capacitor. To protect the capacitor against overvoltages, it is previously known to connect the capacitor in parallel with a spark gap, which is triggered in a suitable way at an overvoltage across the capacitor. In this way the line current is shunted past the capacitor, which is thus protected. To limit the discharge current of the capacitor through the spark gap, it has so far been necessary to arrange an impedance element, usually an inductor, in series with the spark gap. However, use of the inductor means a not significant complication of the protective equipment, rendering the equipment more expensive.

Furthermore, it has proved to be difficult or impossible to produce spark gaps of the kind referred to above which, without demands for maintenance, provide a reliable function also at lower voltage levels. For this reason, the use of series capacitors has been limited at lower system voltages. However, there is a need to be able to use series capacitors also at lower mains voltages, for example in distribution networks for elecric power.

SUMMARY OF THE INVENTION

The present invention aims to provide an overvoltage protective device for series capacitor equipment, which functions reliably also at low mains voltages and which has a simple and economically favorable design.

What characterizes an overvoltage protective device according to the invention will be clear from the appended claims.

In an overvoltage protective device according to the present invention, the first igniting auxiliary spark gap, which determines the level of protection of the device, is only subjected to limited current and for a very brief period of time. This makes the stresses on this spark gap low, which results in a reliable mode of operation of the overvoltage protective device for a long period of time, and this without the need of maintenance. According to a preferred embodiment of the invention, this first igniting spark gap is designed as a so-called surface flashover path, thus obtaining a relatively long arc with a high arc voltage drop very rapidly and at a low flashover voltage.

BRIEF DESCRIPTION OF THE DRAWINGS

In the following the present invention will be described in greater detail with reference to the accompanying FIGS. 1-6 in which.

Figure 1:
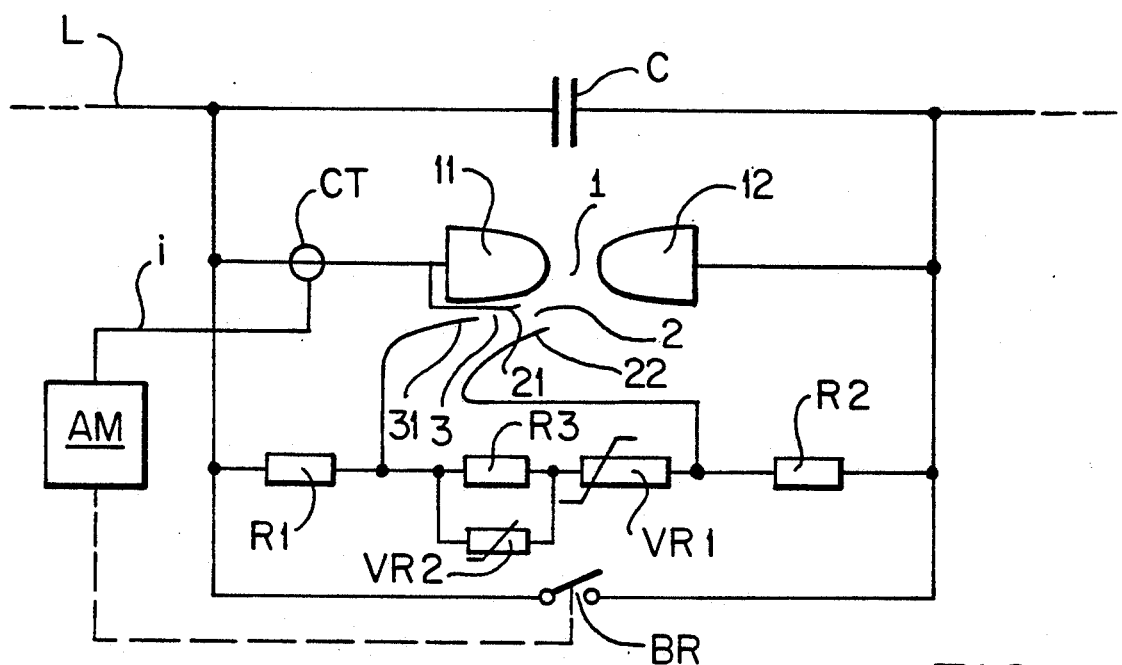
FIG. 1 shows a circuit diagram of one embodiment of the present.
Figure 2:
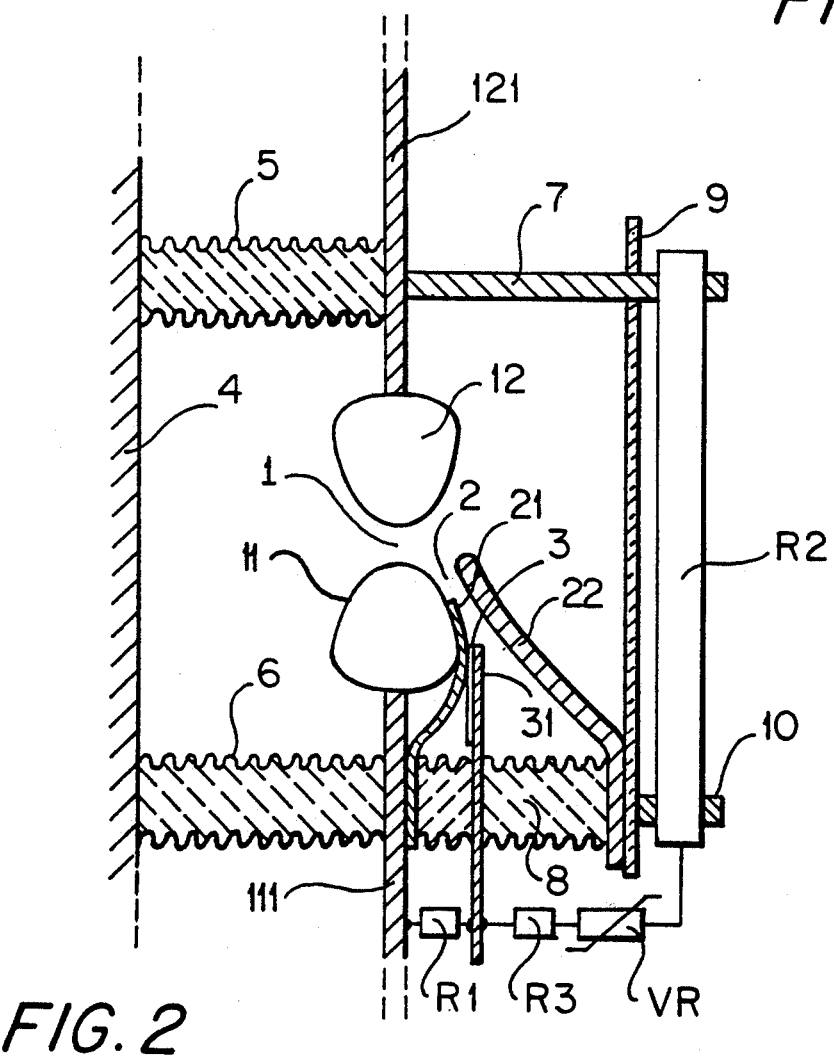
Figure 3:
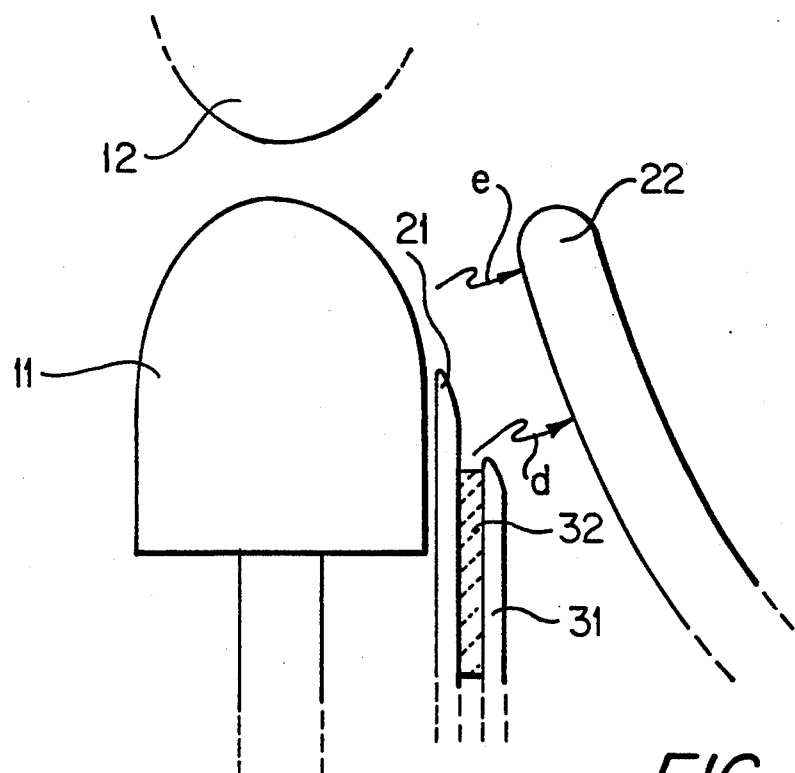
Figure 4:
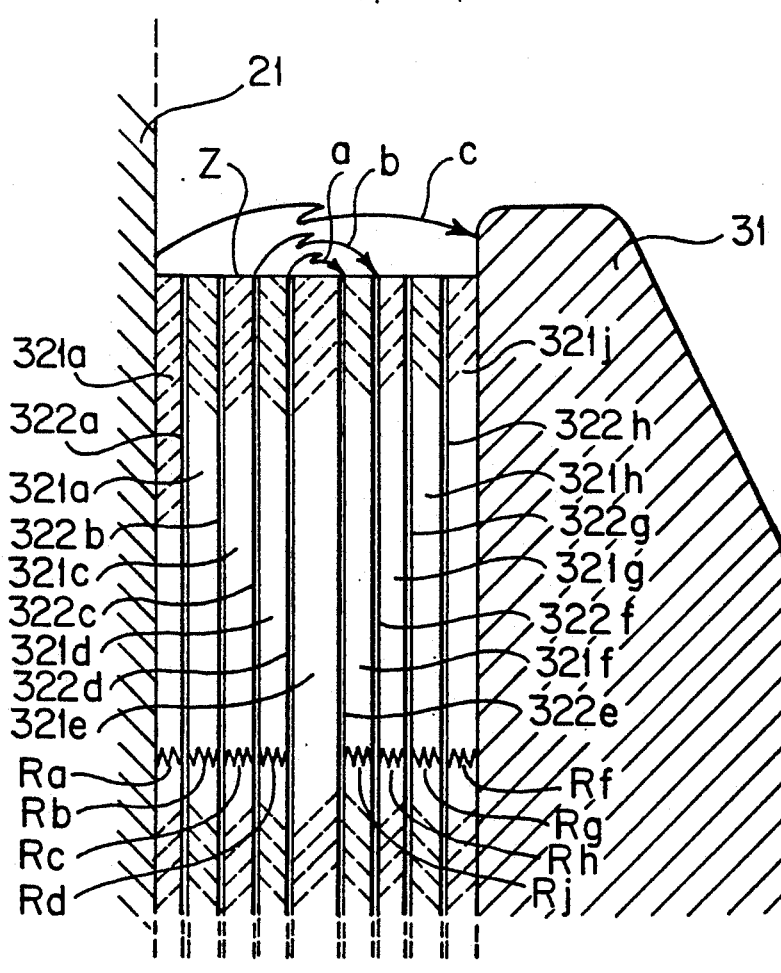
Figure 5:
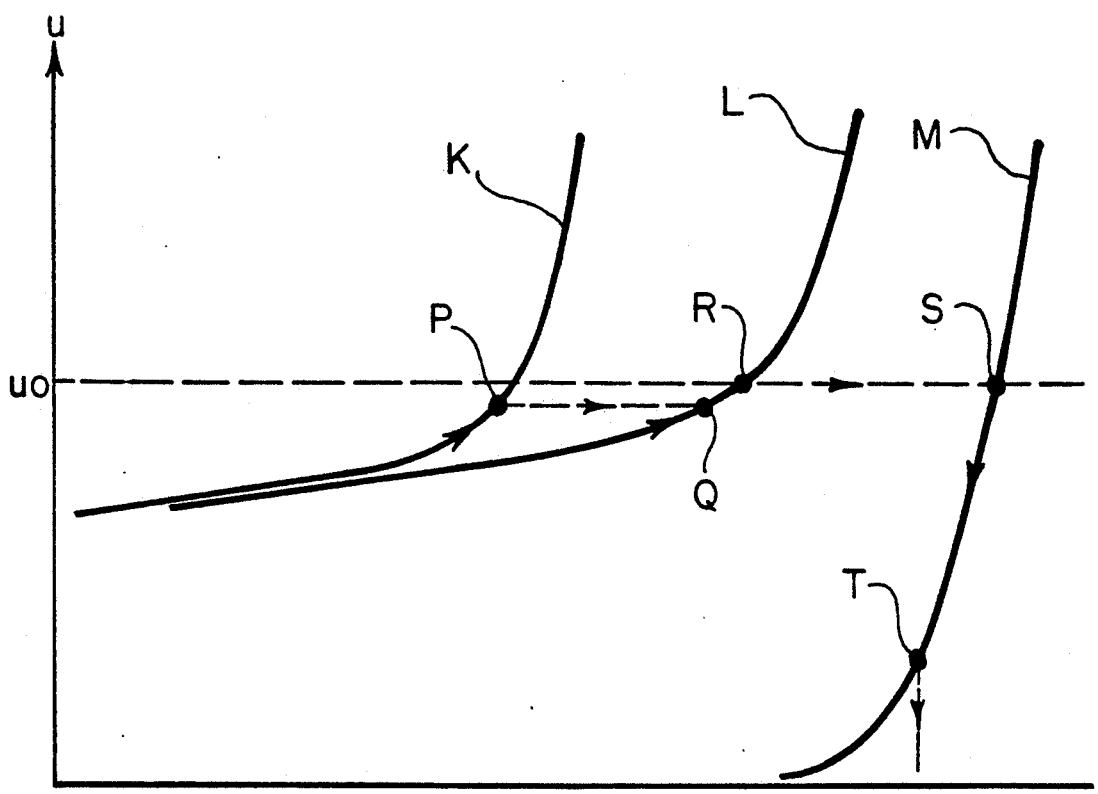
Figure 6:
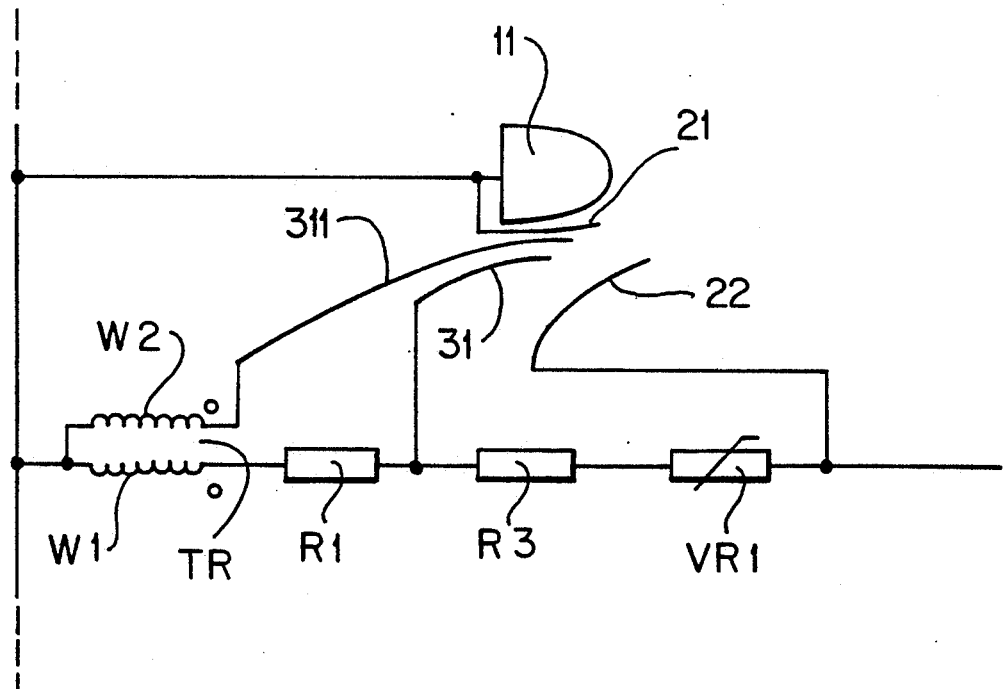

ration of the overvoltage protective device according to FIG. 1;

FIG. 3 shows in more detail how the auxiliary spark gaps are arranged adjacent to the main spark gap in the device according to FIGS. 1 and 2;

FIG. 4 shows how the first igniting auxiliary spark gap according to a preferred embodiment may be designed as a surface flashover path;

FIG. 5 illustrates how the voltage across and the current through the overvoltage protective device vary during an operation of the protective device;

FIG. 6 shows an alternative embodiment in which a voltage transformer is used for igniting the first igniting auxiliary spark gap.

DESCRIPTION OF THE PREFERRED EMBODIMENTS

FIG. 1 shows an embodiment of an overvoltage protective device according to the invention. The figure shows the protective device for one phase of a power line, which may be a single-phase or three-phase power line. When applying the protective device to a three-phase line, three protective circutis of the kind shown in the figure are arranged, one circuit for each phase of the line.

In one power line L, a series capacitor C is arranged. In practice, the capacitor consists of a large number of series- or parallel-connected capacitor units. A main spark gap is connected in parallel with the capacitor C. The spark gap has the main electrodes 11 and 12. A current sensing member CT, for example a current transformer, is connected in series with the spark gap and delivers a signal i which corresponds to the current through the spark gap. The signal i is supplied to the release mechanism AM of a circuit breaker BR, which is normally open but which is closed upon activation of the spark gaps. The circuit breaker provides, in a known manner, a bypass path which after an activation causes the arc in the spark gap 1 to become extinguished. Thereafter, the circuit breaker may be opened, whereupon the overvoltage protective device is ready for renewed operation. For ignition of the main spark gap 1, a first auxiliary spark gap 2 is arranged adjacent to the main gap. The spark gap 2 is designed such that, after ignition of the gap, the arc is moved by the current forces in a direction towards the main gap 1 to bring about ignition thereof. The spark gap 2 has an electrode 21 which is connected to the electrode 11 and an electrode 22 which is connected to an impedance chain arranged parallel to the main spark gap and the capacitor. This chain consists of three series-connected resistors R1, R2 and R3 and a metal oxide varistor VR1. The resistor R1 preferably has the highest resistance, for example 1000 Ω, and the resistor R2 the lowest resistance, for example 1 Ω. The resistor R3 preferably has a resistance between these two values, for example 10 Ω. The varistor VR1 has a "knee" voltage which with a certain margin exceeds the highest voltage, occurring during normal operation, across the series capacitor and which defines the level of protection of the overvoltage protective device. At voltages below the mentioned knee voltage, the current through the resistor is low but increases rapidly when the varistor voltage exceeds the knee voltage. The electrode 22 of the auxiliary spark gap 2 is connected to the impedance chain at a point located between the varistor and the resistor R2. The resistor R3 is connected in parallel with a second varistor VR2 for limitation of the voltage across the capacitor bank C which arises during the ignition process.

For ignition of the auxiliary spark gap 2, a second auxiliary spark gap 3 is arranged. It has one of its electrodes in common with the electrode 21 of the spark gap 2 and its other electrode 31 is connected to the impedance chain at a point between the resistors R1 and R3.

FIG. 2 shows an example of the mechanical configuration of the overvoltage protective device. Insulating supports 5 and 6 are applied on a supporting plate 4 and support the electrodes 11 and 12 of the main spark gap 1 and the leads 111 and 121 of the electrodes. The insulator 6 supports a third insulator 8, which in turn supports the electrode 22 of the spark gap 2 and the electrode 31 of the spark gap 3. The insulator 5 supports a conducting bar 7 which is electrically connected to the lead 121 and which is connected at its outer end, via an electrically insulating support 9, to the outer end of the insulator 8. At its outer end, this insulator 8 also supports a metal bar 10 connected to the electrode 22. This bar 10 and the outer end of the bar 7 are connected to and serve as mounting points for the resistor R2. The series connection of the varistor VR and the resistor R3 is connected between the bar 10 and the electrode 31. The resistor R1 is connected between the electrode 31 and the lead 111.

The design of the main and auxiliary spark gaps is shown on a somewhat enlarged scale in FIG. 3, in which the reference numeral 32 designates a package of intermediate electrodes which is sandwiched between the electrodes 21 and 31 of the spark gap 3 (see further below).

FIG. 4 shows an example of a possible configuration of the auxiliary spark gap 3. Between its main electrodes 21 and 31, a number (8) of intermediate electrodes in the form of metal foils or thin metal sheets are arranged and designated 322a–322h. The intermediate electrodes are separated by electrically insulating layers 321a–321j. The intermediate electrodes are divided into two groups. The electrodes 322a–322d are connected to each other and to the electrode 21 with the aid of the resistors Ra, Rb, Rc and Rd. In a corresponding way, the intermediate electrodes 322e–322h are connected to each other and to the electrode 31 with the aid of the resistors Rf-Rj. At their upper ends in FIG. 4, the intermediate electrodes and the insulating foils or sheets form a plane surface Z, along which, upon activation of the spark gap, flashover may occur between the different electrodes. At its lower end in FIG. 4, the electrode package is designed such that its dielectric strength at that point is greater than at the surface Z to ensure that flashover occurs at the latter surface.

A spark gap of the type shown in FIG. 4 is known from the Swedish published patent application with publication number 376 126. As shown in this publication, a spark gap of this type may be formed in several alternative ways.

The spark gaps may, for example, have the following flashover distances:
the main spark gap 1A: 10–20 mm
the first auxiliary spark gap 2: 10–20 mm
the second auxiliary spark gap 3: 3–5 mm It should be noted here that regarding the spark gap 3, the total flashover distance (between electrodes 21 and 31 in FIG. 4) is meant.

As will be shown below, according to the invention a fast and reliable ignition of the spark gaps is obtained at an accurately defined level of protection (voltage across the capacitor bank C), and this independently of the flashover distances of the spark gaps 1 and 2. The function of the overvoltage protective device according to the present invention therefore becomes independent of changes of the flashover distance, for example electrode wear, which are caused by repeated activations of the protective device.

FIG. 5 shows the voltage u across the impedance chain (and hence across the series capacitor) as well as the current I through the impedance chain. The voltage scale is linear and the current scale logarithmic. Prior to ignition of any spark gap, voltage and current follow curve K. The resistor R1 predominates entirely over the other two resistors and absorbs the voltage difference between the voltage u across the whole impedance chain and the knee voltage of the varistor VR1. After ignition of the spark gap 3, the resistor R1 is short-circuited (apart from the arc voltage drop in spark gap 3). The difference between the voltage of the impedance chain and the knee voltage of the varistor is substantially entirely absorbed by the resistor R3. Voltage and current follow curve L. After ignition of the spark gap 2, also the resistor R3 and the varistor VR1 are short-circuited (apart from the arc voltage drop in spark gap 2). The resistor R2 absorbs the whole applied voltage, and voltage and current follow curve M.

In the following, the mode of operation of the overvoltage protective device will be described. When an overvoltage across the series capacitor C reaches the knee voltgage of the varistor VR1, the varistor current increases rapidly at an approximately constant voltage across the varistor. The rapidly increasing voltage gives rise to a corresponding rapid voltage increase across the resistor R1. This voltage is applied between the intermediate electrodes 322d and 322e in the spark gap 3. When the voltage reaches a certain value, for example 0.5 kV, a flashover occurs between these electrodes ("a" in FIG. 4). The current in the arc gives rise to voltage drops in the resistors Rd and Rj and hence to a propagation of the arc to the intermediate electrodes 322c and 322f ("b" in FIG. 4). In this way, the arc propagates very rapidly along the surface Z from intermediate electrode to intermediate electrode until the discharge takes place directly between the main electrodes 21 and 31 ("c" in FIG. 4). The arc propagates upwards in FIG. 4, that is in a direction towards the auxiliary spark gap 2.

In the manner now described, a relatively long (for example 3–5 mm) arc is obtained very rapidly at low voltage. Since the arc is moved rapidly out from the surface Z towards the auxiliary spark gap 2, the advantages are obtained, namely, that the spark gap 3 is not damaged by the arc and that a rapid and reliable ignition of the spark gap 2 is obtained.

During the process described above, voltage and current first follow curve K in FIG. 5. At point P the auxiliary spark gap 3 is ignited, whereupon current and voltage follow curve L from point Q in a direction towards increasing voltage and current. At point R ignition of the spark gap 2 occurs (at "d" in FIG. 3). Among other things because of the current forces, the arc will be moved in a direction upwards in FIG. 3, in the same way as in the spark gap 3, that is in a direction towards the main spark gap 1 (a later position of the arc is designated "e" in FIG. 3).

After ignition of the spark gap 2, the current through the impedance chain is substantially only limited by the resistance of the resistor R2, which is relatively low. During the time from the ignition of the spark gap 2 and up to the point where the arc in this spark gap has been moved to and caused ignition of the main spark gap 1, therefore, a relatively rapid discharge of the capacitor C will take place through the resistor R2 and the spark gap 2. This time may for example be 500–1000 μs. The resistance of the resistor R2 may be chosen such that during the period of time just mentioned the capacitor C is discharged to such an extent that its voltage drops to a fraction of the level of protection. The energy stored in the series capacitor is then absorbed substantially by the resistor R2, the energy-absorbing ability of which must be dimensioned accordingly.

As previously mentioned, the gap 2 is ignited at point R in FIG. 5, whereafter current and voltage follow curve M from point S in the direction of the arrow. During this process a rapid discharge of the series capacitor takes place, during which current and voltage drop. The main spark gap is ignited at point T. Because of the above-described discharge of the capacitor prior to ignition of the main spark gap, this ignition may take place without any harmful inrush current surge.

Thereafter, the main spark gap 1 conducts the line current past the capacitor C until the circuit breaker BR has had time to close and create a mechanical bypass path past the capacitor and the spark gap. This causes the main spark gap 1 to become extinguished, and after the network disturbance has ceased the circuit breaker BR may again be opened, whereafter the protective device is ready for renewed operation.

FIG. 6 shows an alternative embodiment, in which the resistor R1 has been partially replaced by a voltage transformer TR, the primary winding of which is connected into the impedance chain R3-VR1-R2 and the secondary winding of which is connected to an extra intermediate electrode 311 in the auxiliary spark gap 3. When the knee voltage of the varistor VR1 is exceeded, a voltage occurs across the primary winding W1 of the transformer, and the voltage induced in the secondary winding W2 triggers the auxiliary spark gap 3. In this embodiment, thus, the stratified embodiment of the spark gap 3 according to FIG. 4 is replaced by the intermediate electrode 311.

The resistor R3 in the above-described embodiments may possibly be omitted, as well as the varistor VR2. The varistor VR2 may be replaced by or supplemented by a varistor which is connected in parallel with the entire impedance chain R1-R3-VR1-R2 and hence with the capacitor bank C.

According to another alternative embodiment, the resistor R2 may be replaced by an inductor for limiting the discharge current of the capacitor. This inductor may then be placed in the conductor, common to the spark gaps, which connects the overvoltage protective device to the line L.

An overvoltage protective device according to the invention has considerable advantages over prior art overvoltage protective devices. Thus, the so-called trigger factor (the ratio between, on the one hand, the firing voltage of the spark gap arrangement without a trigger circuit and, on the other hand, the firing voltage of the same spark gap arrangement with a trigger circuit) is very high. This causes the demands for accurate adjustment of electrode distances to be low and the influence of electrode wear, or of other changes in the electrode condition, to become insignificant. Further, the overvoltage protective device according to the invention may be used at considerably lower levels of protection than what has previously been possible with similar protective devices. It has proven to provide good function down to levels of protection of a few kV, while at the same time it may be designed so as to provide satisfactory protection also when using the highest line voltages occurring. As will be clear from the above, during the successive ignition of the spark gap of the overvoltage protective device, a discharge of the series capacitor down to a fraction of the original capacitor voltage takes place. This makes it possible to connect the main spark gap directly across the series capacitor without using damping inductors or other impedance elements for limiting the discharge current of the capacitor. This provides a simpler, economically more favorable and more compact design of an overvoltage protective device than what has earlier been possible. By the above-described embodiment of the auxiliary spark gap according to the invention in which the ignition is initiated, this spark will effectively protected from the harmful influence of arcs, thus ensuring a reliable function at low firing voltage of this spark gap for a long period of time and without the need for maintenance.

I claim:

1. An overvoltage protection device for series capacitor equipment, comprising:
    a main spark gap with a first and a second main electrode for connection in parallel with a series capacitor, and adapted to be ignited at a predetermined level of the voltage across the series capacitor, comprising:
    a series connection connected parallel to the main spark gap and including a first voltage-dependent impedance element with a predetermined knee voltage in which, when said predetermined knee voltage is exceeded, the impedance of the element drops, and a firing voltage-generating member which is adapted, upon an increase of the current through the first voltage-dependent impedance element to deliver a voltage for activating the spark gap of the overvoltage protective device;
    a first auxiliary spark gap arranged adjacent to the main spark gap for ignition thereof, with a first electrode connected to the first main electrode of the main spark gap and a second electrode connected to the second main electrode of the main spark gap;
    a second auxiliary spark gap arranged adjacent to the first auxiliary spark gap for ignition thereof, with a first main electrode connected to the first main electrode of the main spark gap and with a second main electrode connected to said firing voltage-generating member adapted to be supplied with said voltage for ignition of said second auxiliary spark gap;
    wherein said second auxiliary spark gap is so designed that, upon ignition of this spark gap, the arc in the gap is driven by current forces in a direction towards said first auxiliary spark gap for ignition thereof;
    wherein said first auxiliary spark gap is so designed that upon ignition of this first spark gap, the arc in the gap is driven by current forces in a direction towards the main spark gap for ignition thereof; and wherein said second electrode of said first auxiliary spark gap is connected to said second main electrode of said main spark gap through a first resistor for discharge of said capacitor through said first auxiliary spark gap and said first resistor before ignition of the main spark gap.

2. An overvoltage protection device according to claim 1, wherein:

said second auxiliary spark gap comprises a plurality of intermediate electrodes sandwiched between the first and second main electrodes of the spark gap, said intermediate electrodes dividing the spark gap into a number of partial spark gaps;

the electrodes of the spark gap are divided into two electrode groups, each comprising a main electrode and a number of intermediate electrodes;

the intermediate electrodes included in each group are connected to each other and to the main electrode included in the group with the aid of resistor elements; and the ignition of the spark gap thus starting with ignition of the partial spark gap which separates the electrode groups, followed by successive ignition of the other partial spark gaps.

3. An overvoltage protection device according to claim 2, wherein the intermediate electrodes are separated by intermediate bodies of insulating material, which together with the intermediate electrodes form a substantially continuous surface extending between the main electrodes of the second auxiliary spark gap.

4. An overvoltage protection device according to claim 1, wherein the first voltage-dependent impedance element consists of a voltage-dependent resistor.

5. An overvoltage protection device according to claim 1, wherein the firing voltage-generating member consists of a second resistor connected in parallel to the second auxiliary spark gap.

6. An overvoltage protection device according to claim 5, wherein the resistance of said second resistor is higher than the resistance of said first resistor.

7. An overvoltage protection device according to claim 5, wherein a third resistor is connected in series with the first voltage dependent impedance element.

8. An overvoltage protection device according to claim 6, wherein the resistance of the third resistor has a value between the resistance values of the first and second resistors.

9. An overvoltage protection device according to claim 6, wherein a second voltage-dependent impedance element is connected in parallel to the third resistor.

10. An overvoltage protection device according to claim 2, wherein the firing voltage-generating member consists of a first second resistor connected parallel to the second auxiliary spark gap.

11. An overvoltage protection device according to claim 10, wherein the resistance of said second resistor is higher than the resistance of said first resistor.

12. An overvoltage protection device according to claim 10, wherein a third resistor is connected in series with the first voltage dependent impedance element.

13. An overvoltage protection device according to claim 12, wherein the resistance of the third resistor has a value between the resistances of the first and second resistors.

14. An overvoltage protection device according to claim 13, wherein a second voltage-dependent impedance element is connected in parallel to the third resistor.

15. An overvoltage protection device according to claim 4, wherein the firing voltage-generating member consists of a first second resistor connected parallel to the second auxiliary spark gap.

16. An overvoltage protection device according to claim 15, wherein the resistance of said second resistor is higher than the resistance of said first resistor.

17. An overvoltage protection device according to claim 15, wherein a third resistor is connected in series with the first voltage dependent impedance element.

18. An overvoltage protection device according to claim 17, wherein the resistance of the third resistor has a value between the resistances of the first and second resistors.

19. An overvoltage voltage protection device according to claim 18, wherein a second voltage-dependent impedance element is connected in parallel to the third resistor.

20. An overvoltage protection device according to claim 2, wherein the first voltage-dependent impedance element includes a voltage-dependent resistor.

* * * * *

UNITED STATES PATENT AND TRADEMARK OFFICE
CERTIFICATE OF CORRECTION

PATENT NO. : 5,325,259
DATED : June 28, 1994
INVENTOR(S) : Lars Paulsson

It is certified that error appears in the above-indentified patent and that said Letters Patent is hereby corrected as shown below:

Column 6,

Claim 1, line 7, please insert --said device-- before "comprising".

Signed and Sealed this

Eighteenth Day of April, 1995

Attest:

BRUCE LEHMAN

Attesting Officer

*Commissioner of Patents and Trademarks*